Aug. 31, 1948.  C. C. SWANN  2,448,499
METHOD OF PRODUCING STRANDS OF
INTERTWISTED GLASS FIBERS
Filed March 10, 1944  3 Sheets-Sheet 1

INVENTOR.
Carl C. Swann
BY
ATTORNEYS

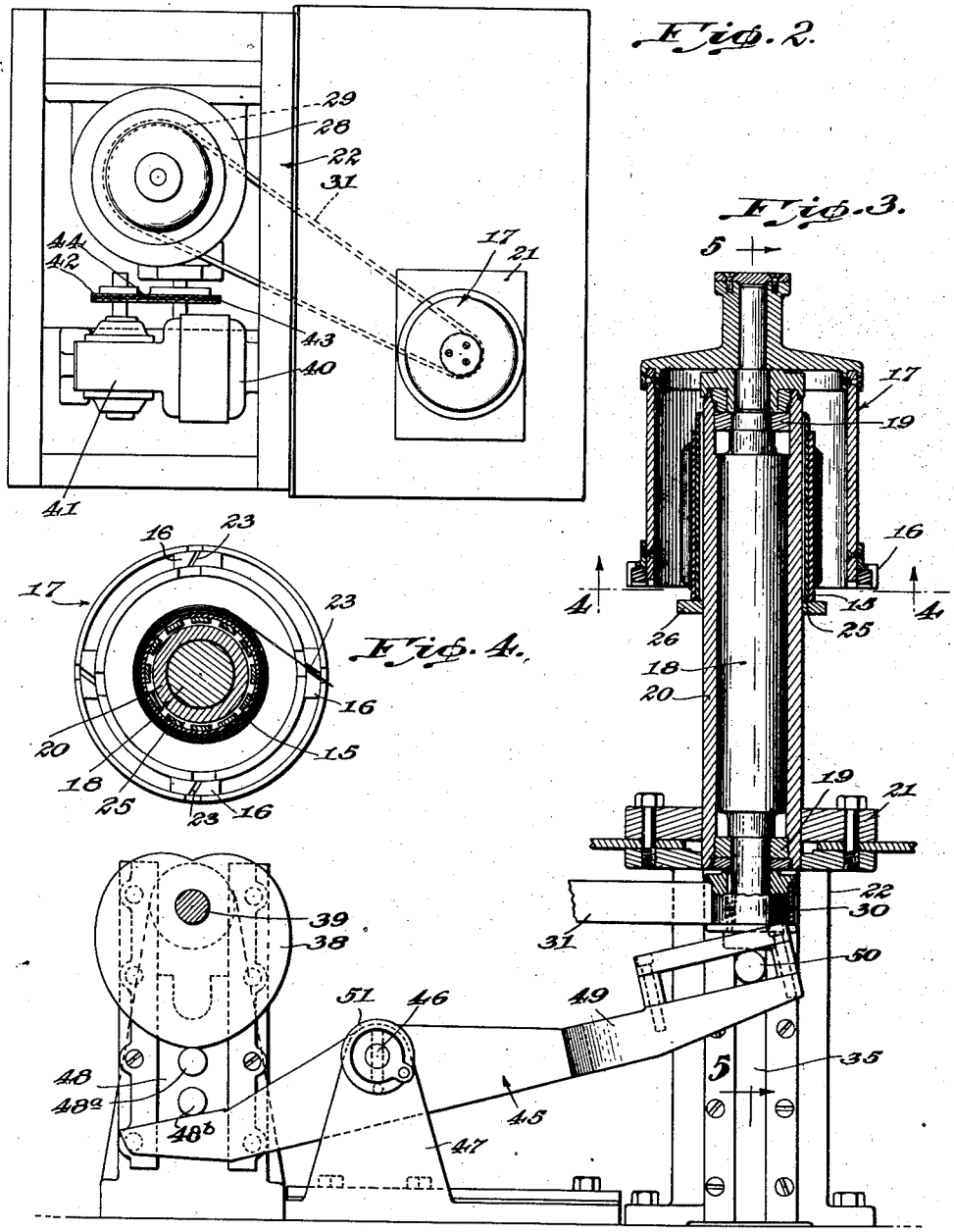

Aug. 31, 1948.     C. C. SWANN     2,448,499
METHOD OF PRODUCING STRANDS OF
INTERTWISTED GLASS FIBERS
Filed March 10, 1944     3 Sheets-Sheet 3
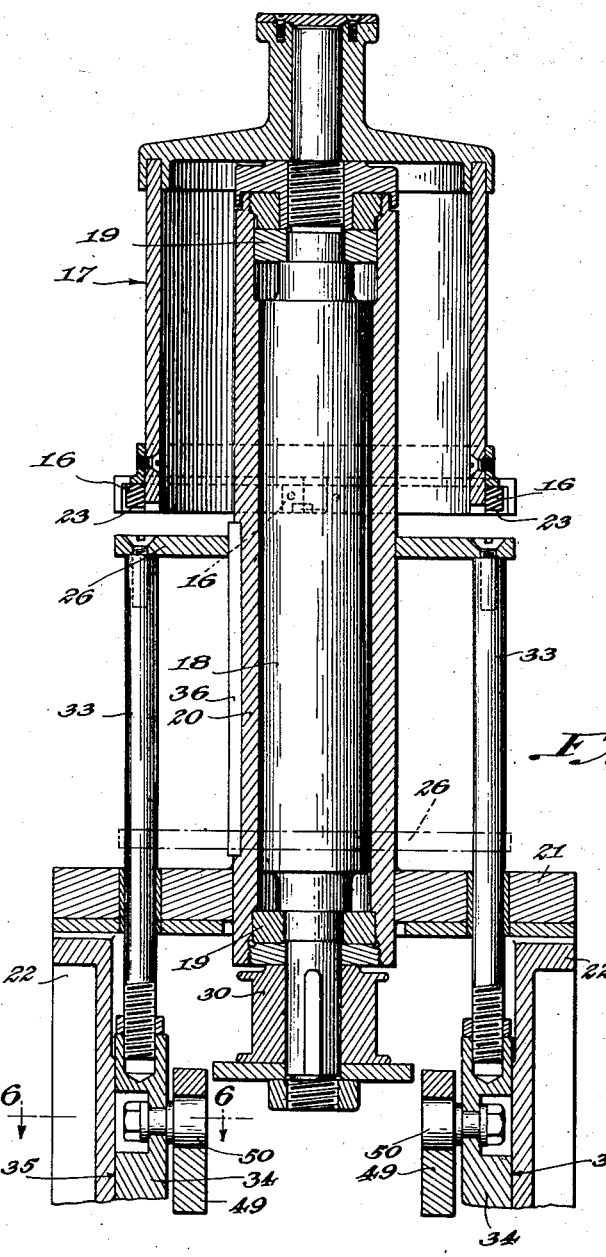
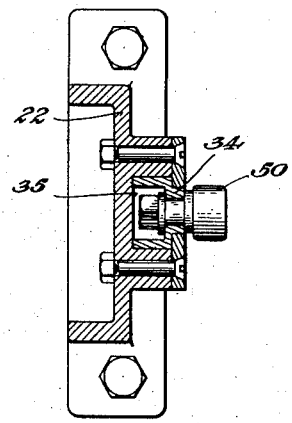
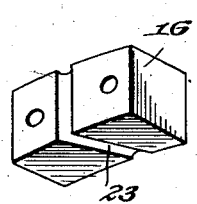
INVENTOR.
Carl C. Swann
BY
ATTORNEYS Patented Aug. 31, 1948

2,448,499

UNITED STATES PATENT OFFICE 2,448,499

METHOD OF PRODUCING STRANDS OF INTERTWISTED GLASS FIBERS

Carl C. Swann, Kingsport, Tenn., assignor to Owens-Corning Fiberglas Corporation, a corporation of Delaware Application March 10, 1944, Serial No. 525,968

4 Claims. (Cl. 49—77)

This invention relates generally to the production of fibers from glass or the like materials and, more particularly, to improved processes for manufacturing yarns of continuous glass fibers.

One method now used to produce continuous glass fibers is to melt a body of glass in a bushing having a multiplicity of small orifices at the bottom thereof through which molten glass flows in the form of streams. The streams are attenuated by means of a rotating drum or spool to form fine glass fibers and the latter are wound onto the drum after being gathered into a strand by a guide supported between the bushing and drum.

As the strand is wound on the drum it must be traversed along the drum to build up a uniform package of material on the drum. This traversing operation has been accomplished heretofore by locating the guide for the strand outside the space bounded by planes normal to the drum axis and passing through the drum at the ends of the package. Due to this offset relation of the guide to the drum, the strand is drawn toward the drum in a path angularly related to the axis of the drum so that it traverses along the drum in one direction under influence of its tendency to meet the surface of the drum at a right angle. At the end of the traverse in this direction, the strand is engaged by a finger moving lengthwise of the drum and is returned along the drum to effect traverse in the other direction. This mode of traversing is disclosed in the Thomas and Fletcher Patent No. 2,325,640, dated August 3, 1943.

The production of glass fiber strands by this method is limited by several factors. In the first place the angular relation of the strand to the drum axis and the reliance on this angularity to effect traverse of the strand in one direction requires that a relatively great distance be provided between the guide or source of the strand and the drum. Actual practice has shown that the guide must be from 10 to 15 feet above the drum, thus requiring the bushing for feeding the glass streams to be located on a floor or platform above the floor on which the drum and associated winding mechanism are located. Machines arranged in this way require two operators to a machine, one to operate the winding drum and another to tend the bushing.

Equipment of this character also requires considerable space and otherwise complicates installations in that two-story structures, platforms, and special supporting means must be employed.

It is an object of this invention to provide a method of producing strands of glass fibers, that may be accomplished on one floor level by one operator.

Essentially, this is accomplished by disposing the winding drum or spool with its central longitudinal axis extending in a direction generally parallel with the path of the strand from the bushing to the spool, and traversing the strand relative to the spool in the same direction. Traverse of the strand crosswise of the path of the strand as it moves toward the spool being thus eliminated, the spool and bushing may be located in proximity. In other words, this feature obviates the necessity of shifting the fibers transversely of the direction of travel of the fibers to effect the traversing function, and is largely responsible for the possibility of reducing the installation space to a minimum.

In previous traversing methods the winding and attenuating drum was rotated at very high speed to obtain a high rate of production. Ordinarily a lubricant and/or binder material is applied to the fibers to inhibit mutual abrasion of the fibers and to hold them together in the strand. Some of this material was displaced from the strands by the centrifugal force developed by high-speed rotation of the package and thrown toward the outside portions of the package of strands on the drum.

The present invention overcomes this objection by providing a method wherein the fibers are wound on the spool without the necessity of rotating the latter. Not only does this permit greater winding speeds without displacement of the lubricant and binder but has the added advantage of permitting a greater quantity of fibrous strands to be wound on the spool since the dangers incident to high speed rotation, such as loosening of the windings of the strands at the ends of the package, are avoided.

This invention has as another of its objects the reduction of the time heretofore required in producing twisted strands of fibers or yarns.

Heretofore glass fibers of the continuous type have been produced as untwisted strands in which the fibers were arranged in parallelism. The strands had by themselves very little integrity and binding material was necessarily applied to the fibers to bind them together in the strand. The present invention provides for twisting the strands as they are formed and prior to being wound on the packaging spool. The need for binding material is thus greatly lessened and in many cases no binding material is required.

Further, twisting the fibers together during the forming operation in accordance with the invention eliminates an entire operation in the production of glass fiber textiles. Whereas, previously, strands of glass fibers had to be unwound from the original packaging spool and twisted and rewound before they could be woven or knitted, the present invention produces yarns of glass fibers that may be directly processed into woven or knitted cloths.

The foregoing, as well as other objects, will be made more apparent as this description proceeds, especially when considered in connection with the accompanying drawings, wherein:

Figure 2 is a top plan view of the construction shown in Figure 1;

Figure 3 is a sectional elevational view of the attenuating, winding and twisting mechanism;

Figure 4 is a cross-sectional view taken on the line 4—4 of Figure 3;

Figure 5 is a sectional elevational view of the apparatus at right angles to the showing in Figure 3 and taken on the line 5—5 of Figure 3;

Figure 6 is a sectional view taken on the line 6—6 of Figure 5; and

Figure 7 is a perspective view of one of the strand guiding blocks.

Figure 1:
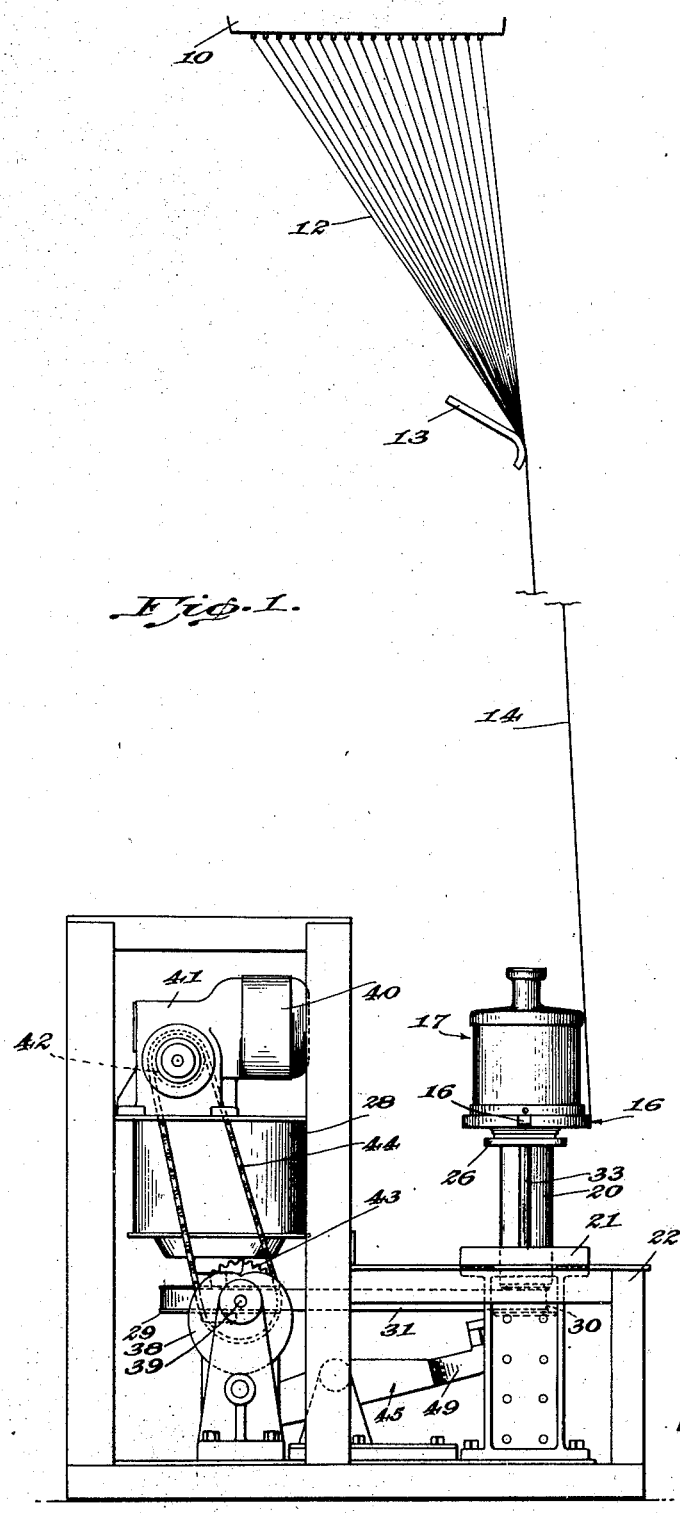
Figure 1 is a semi-diagrammatic elevational view of fiber forming apparatus embodying my invention.

Referring to Figure 1 of the drawings, a bushing 10 adapted to contain a body of molten glass or similar material, has a plurality of orifices in its bottom wall through which the molten glass flows in the form of a corresponding number of streams. The streams are continuously attenuated to form fibers 12 and, if desired, the fibers are caused to pass over a pad 13 which gathers the fibers into a strand 14 and simultaneously applies a lubricant and/or binder to the fibers.

In accordance with the present invention, attenuation of the fibers is effected by winding the strand onto a rotatively stationary packaging spool 15 by means of a guide 16 over which the strand passes and that moves in a circular path around the spool. At the same time, there is relative movement between the guide and the spool in a direction lengthwise of the spool to traverse the strand along the spool to build up a uniform package.

As the guide moves in its path, which is preferably located in a plane normal to the central axis of the spool, it simultaneously attenuates the streams of molten glass and twists the strand of attenuated fibers into a yarn. The simple expedient of rotating the guide about the spool thus accomplishes in a single operation what previously required two separate steps, namely, attenuation and winding of the fibers in a strand, and subsequently twisting and rewinding the strand.

Also, the twisted strand wound on the spool has a much higher degree of integrity than the strand of fibers produced by previous apparatus so that it maintains its identity, and fibers of adjacent turns of the twisted strand are prevented from intertangling. As a result, the twisted strand may be wound with a very slow traverse since angular crossing of the turns need not be depended upon to prevent intertangling. In addition, less binding material is required to hold the fibers together in the strand, thereby simplifying manufacture and decreasing the quantity of foreign material on the glass fibers, which material often impairs the properties of the glass fibers for some applications.

The guide 16 is mounted for rotation about the spool 15 and is supported on the lower margin of an inverted cup-shaped cap 17. The guide 16 is preferably in the form of a block as shown in Figure 7 and several may be provided in the rim of the cap 17 as indicated in Figure 4 to permit more readily engaging the strand when the device is started. The cap is rotated about an axis, preferably vertical, that coincides with the central longitudinal axis of the spool. The cap (Figure 5) is removably mounted at the central portion of its upper end on the upper end of a shaft 18 which is journaled in upper and lower bearings 19 within a stationary tubular column 20 fixed to a plate 21 forming a part of the machine frame 22.

The strand 14 as illustrated in Figure 4 passes through a groove 23 in the guide 16 and is directed radially inwardly beyond the bottom edge of the cup-shaped member 17. The strand is then wound about the spool 15 or supporting tube to form the package. The spool 15 is frictionally supported against rotation on a sleeve 25 fixed to a plate 26 and movable vertically therewith along the column 20 as will be brought out presently.

By this arrangement the spool 15 is concentrically supported with respect to the annular bottom edge of the inverted cup-shaped cap 17 and rotation of the cap effects a corresponding rotation of the guide 16 around the spool 15. The strand 14 by its engagement with the guide 16 is twisted into a yarn as the cap is rotated, the twist occurring between the cap and the pad 13. The yarn after passing through the groove 23 in the guide 16 is wound on the spool 15. At the same time, a pull is exerted on the strand sufficient to attenuate the streams of molten glass into extremely fine fibers. This is accomplished without rotation of the spool 15 so that a binder and/or lubricant applied to the fibers prior to packaging the strand is not displaced from the fibers in the package and thrown outwardly during the winding operation by centrifual force. Also, the rotatively stationary spool permits a greater weight of strand to be wound on the spool without incurring the dangers incident to rotating relatively heavy bodies at high speed.

The cap 17 is rotated by an electric motor 28 (Figures 1 and 2) supported on the machine frame 22 and having a pulley 29 on the drive shaft thereof connected to a pulley 30 on the lower end of the vertical shaft 18 by means of a belt 31. The motor may be of a suitable variable speed type so that the winding and attenuating speed may be controlled to suit operating conditions.

At the same time that the inverted cup-shaped cap 17 is rotated by the shaft 18 to effect the winding operation, the sleeve 25 together with the spool 15 is reciprocated along the shaft 18 and column 20 to traverse the spool relative to the guide 16 to distribute the strand along the spool. For accomplishing this, the plate 26 is supported by and secured to the upper ends of a pair of oppositely disposed rods 33 which extend downwardly through the plate 21 at either side of the column 20 and have their lower ends adjustably secured to a pair of slide blocks 34 (Figures 3 and 5). The blocks 34 are mounted in slideways 35 formed in the machine frame 22. A keyway formed in the plate 26 engages a key 36 secured to the column 20 which limits any tendency of the tube 15 and associated supporting mechanism to rotate as the strand is wound into a package thereon.

The vertical reciprocating movement of the slide block 34 and spool support is controlled by a cam 38 mounted for rotation about a horizontal axis on a shaft 39. Rotation is imparted to the cam by an electric motor 40 (Figure 1) mounted on the frame 22 and drives the cam through suitable gear reduction means 41. A sprocket 42 on the gear reducer 41 is connected with a sprocket 43 on the cam shaft 39 by a chain 44. The speed of rotation of the cam 38 controls the vertical movement of the tube 15 and regulates the building of the package of strand during operation of the machine.

The cam 38 (Figure 3) is arranged to operate a lever 45 fulcrumed at 46 on a support 47 on the machine frame 22. The cam is operatively connected for moving the lever 45 by means of a slide block 48 movable in a slideway formed in the cam support and which engages both the cam and one end of the lever. Follower rolls 48a and 48b on the slide block 48 engage respectively the cam 38 and lever 45. The opposite end of the lever 45 is forked to provide a pair of arms 49 adapted to slidably engage rollers 50 carried by each of the slide blocks 34 to transmit motion to the spool support.

A torsion spring 51 connected between the lever 45 and support 47 at the fulcrum 46 is adapted to exert a downward pressure on the forked end of the lever thereby maintaining the other end of the lever in contact with the follower rolls 48a, 48b and cam 38. The spring further aids the tendency of the spool and its support to descend by gravity as the low portion of the cam 38 approaches the lever. While the weight of the completed package may be sufficient to normally cause the spool and associated mechanism to descend, the force exerted by the spring 51 provides additional pressure to assure positive action thereof.

Referring now to the operation, the guide 16 is rotated at a relatively high rate of speed around the spool 15 and the latter is simultaneously reciprocated at right angles to the plane of rotation of the guide 16. This reciprocation may be at a relatively low rate, being necessarily only sufficient to lay adjacent turns of the strand onto the spool in side by side relation. The speed of rotation of the guide may be as great as desired to effect the preferred rate of attenuation, there being few of the limitations to this speed that are encountered in rotating a spool at high speed.

After the desired quantity of yarn is packaged on the spool 15, the latter may be readily removed by detaching the cap 17 from the upper end of the shaft 18 and merely slipping the spool 15 off the sleeve 25. A new spool is then placed on the sleeve and the cap 17 is replaced. The strand is wrapped several times about the spool and then led through the guide 16 while rotation of the cap is resumed.

Various modifications may be resorted to within the spirit and scope of the appended claims.

I claim:
1. The method of producing in a single operation strands of intertwisted glass fibers directly from a source of molten glass which comprises flowing a plurality of streams of molten glass to be attenuated to fibers, collecting the fibers into a strand at a fixed point between the source and the point of attenuation, and winding the strand onto an angularly stationary support by revolving the strand therearound under tension, said winding concomitantly imparting a twist to the strand and effecting attenuation of said streams in advance of said collecting point.

2. The method of producing strands of intertwisted glass fibers directly from a source of molten glass in a single operation, which comprises flowing a plurality of streams of molten glass to which attenuating forces are applied to form fibers therefrom, gathering the fibers into a strand at a region spaced from said source and the point of attenuation, and concomitantly attenuating the streams to fibers and twisting the strand below said gathering point by moving said strand in a circular path normal to the direction of flow of the streams and remotely spaced from said gathering point to wind said strand about a relatively angularly stationary support.

3. The method of producing twisted yarns of glass fibers at a high rate of speed directly from a source of molten glass which includes the steps of flowing molten glass in a plurality of streams from which the fibers are formed, gathering the formed fibers at a stationary point spaced from said source to form a strand, guiding said strand onto a non-rotatable support on which it is wound, and imparting a twist to the strand between said gathering point and said support by moving said strand in a circular path around the support, said winding of the strand concomitantly effecting attenuation of the streams to fibers between said source and gathering point.

4. The method of producing strands of intertwisted glass fibers directly from a multiplicity of spaced apart streams of molten glass flowing from a source of molten glass which comprises gathering the fibers into a strand at a point spaced from said source, applying tractive forces to the streams of glass flowing from said source at a point remote from said gathering point to attenuate the streams to fibers, and said tractive forces further revolving said strand substantially about its axis between said gathering point and the point of application of said forces to impart a twist thereto and concomitantly wind said twisted strand onto an angularly stationary support.

CARL C. SWANN.

REFERENCES CITED

The following references are of record in the file of this patent:

UNITED STATES PATENTS

| Number | Name | Date |
| --- | --- | --- |
| 1,168,927 | Bibby | Jan. 18, 1916 |
| 1,505,585 | Clough | Aug. 19, 1924 |

FOREIGN PATENTS

| Number | Country | Date |
| --- | --- | --- |
| 481,126 | Great Britain | Mar. 7, 1938 |